US010771634B2

United States Patent
Nelson et al.

(10) Patent No.: US 10,771,634 B2
(45) Date of Patent: Sep. 8, 2020

(54) DISTRIBUTED LEDGER SYSTEM FOR MANAGEMENT AND TRACKING OF EXCHANGES OF WIRELESS SERVICES BETWEEN WIRELESS SERVICE PROVIDERS

(71) Applicant: Geoverse, LLC, Sammamish, WA (US)

(72) Inventors: Roderick Nelson, Sammamish, WA (US); Carl Gunell, Sammamish, WA (US); Dan Westin, Sammamish, WA (US)

(73) Assignee: GEOVERSE, LLC, Sammamish, WA (US)

( * ) Notice: Subject to any disclaimer, the term of this patent is extended or adjusted under 35 U.S.C. 154(b) by 0 days.

(21) Appl. No.: 16/197,900

(22) Filed: Nov. 21, 2018

(65) Prior Publication Data

US 2019/0158674 A1 May 23, 2019

Related U.S. Application Data

(60) Provisional application No. 62/589,597, filed on Nov. 22, 2017.

(51) Int. Cl.
*H04M 15/00* (2006.01)
*H04W 4/24* (2018.01)
(Continued)

(52) U.S. Cl.
CPC .......... *H04M 15/50* (2013.01); *G06Q 20/065* (2013.01); *H04M 15/8038* (2013.01);
(Continued)

(58) Field of Classification Search
None
See application file for complete search history.

(56) References Cited

U.S. PATENT DOCUMENTS

| 7,027,818 | B2 * | 4/2006 | Bos ........................ | H04W 28/24 |
| | | | | 370/229 |
| 7,133,670 | B1 * | 11/2006 | Moll ..................... | H04W 60/00 |
| | | | | 455/432.1 |

(Continued)

FOREIGN PATENT DOCUMENTS

| EP | 2 698 035 | 12/2015 |
| EP | 2 697 997 | 12/2019 |

(Continued)

OTHER PUBLICATIONS

U.S. Appl. No. 16/221,133, Roderick Nelson, Distributed Ledger System for Management and Implementation of Exchanges of Wireless Services Between Wireless Service Providers, filed Dec. 14, 2018.

(Continued)

*Primary Examiner* — Hong S Cho
(74) *Attorney, Agent, or Firm* — Polsinelli LLP

(57) ABSTRACT

The present disclosure is directed to using distributed ledger architectures to for exchange of wireless communication services. In one example, a distributed ledger system for facilitating an exchange among wireless service providers includes a plurality of wireless service providers and a plurality of nodes. Each of the plurality of nodes is configured to facilitate an exchange between a first wireless service provider and a second wireless service provider for roaming services; generate a recording of terms and conditions of the exchange between the first wireless service provider and the second wireless service provider to yield an agreement; record the agreement on the distributed ledger system; facilitate independent evaluation of performance parameters of the exchange by each of the first wireless service provider and the second wireless service provider to independently evaluate performance parameters of the exchange; and trigger settlement for the exchange based on (Continued)

the independent evaluation of the performance parameters by the first and second wireless service providers.

18 Claims, 9 Drawing Sheets

(51) Int. Cl.
*G06Q 20/06* (2012.01)
*H04W 12/04* (2009.01)
*H04W 12/00* (2009.01)

(52) U.S. Cl.
CPC ............ *H04M 15/81* (2013.01); *H04W 4/24* (2013.01); *H04W 12/001* (2019.01); *H04W 12/04031* (2019.01); *G06Q 2220/00* (2013.01)

(56) References Cited

U.S. PATENT DOCUMENTS

| | | | |
|---|---|---|---|
| 8,620,308 | B2 | 12/2013 | Maria |
| 8,687,557 | B2 | 4/2014 | Perkuhn et al. |
| 9,231,835 | B2 | 1/2016 | Zisimopoulos et al. |
| 9,253,663 | B2 | 2/2016 | Raleigh et al. |
| 9,300,562 | B2 | 3/2016 | Dufour et al. |
| 9,338,654 | B2 | 5/2016 | Moore et al. |
| 9,565,025 | B2 | 2/2017 | Van Veen |
| 9,763,182 | B1 | 9/2017 | Krishnamurthy et al. |
| 10,063,529 | B2 | 8/2018 | Milazzo et al. |
| 2003/0051041 | A1* | 3/2003 | Kalavade ............... G06Q 20/14 709/229 |
| 2007/0199049 | A1* | 8/2007 | Ziebell .................... H04L 63/08 726/3 |
| 2010/0316029 | A1* | 12/2010 | Kappler ............. H04L 41/0813 370/338 |
| 2011/0039518 | A1 | 2/2011 | Maria |
| 2012/0115466 | A1 | 5/2012 | Moore et al. |
| 2012/0134323 | A1 | 5/2012 | Perkuhn et al. |
| 2012/0185578 | A1* | 7/2012 | Perkuhn ................. H04W 8/06 709/223 |
| 2012/0196644 | A1* | 8/2012 | Scherzer ............... H04W 48/18 455/524 |
| 2014/0052852 | A1 | 2/2014 | Dufour et al. |
| 2014/0094159 | A1 | 4/2014 | Raleigh |
| 2014/0115159 | A1 | 4/2014 | Zisimopoulos et al. |
| 2014/0274036 | A1 | 9/2014 | Fan et al. |
| 2015/0215832 | A1* | 7/2015 | Fitzpatrick ............ H04W 48/18 455/426.1 |
| 2017/0076306 | A1 | 3/2017 | Snider et al. |
| 2017/0279783 | A1 | 9/2017 | Milazzo et al. |
| 2017/0287090 | A1* | 10/2017 | Hunn ..................... G06Q 50/18 |
| 2018/0077564 | A1 | 3/2018 | Xu |
| 2019/0080392 | A1 | 3/2019 | Youb et al. |
| 2019/0139047 | A1 | 5/2019 | Ronnow et al. |
| 2019/0150036 | A1 | 5/2019 | Nelson |
| 2019/0191293 | A1 | 6/2019 | Nelson |

FOREIGN PATENT DOCUMENTS

| | | |
|---|---|---|
| WO | WO 2009/006071 | 1/2009 |
| WO | WO 2017/136643 | 8/2017 |
| WO | PCT/US18/61368 | 11/2018 |
| WO | PCT/US18/62235 | 11/2018 |
| WO | PCT/US18/65804 | 12/2018 |
| WO | WO 2019/099729 | 5/2019 |
| WO | WO 2019/104159 | 5/2019 |
| WO | WO 2019/118903 | 6/2019 |

OTHER PUBLICATIONS

U.S. Appl. No. 16/192,629, Roderick Nelson, Distributed Ledger System for Management of Exchanges of Wireless Services Between Wireless Service Providers, filed Nov. 15, 2018.
Langberg, Ehud; "Blockchains in Mobile Networks", Wireless Software Competence Center, Huawei Technologies Co., Ltd. Mar. 14, 2017; [Retrieved from online on Jan. 17, 2019].
PCT Application No. PCT/US2018/061368 International Search Report and Written Opinion dated Feb. 8, 2019.
PCT Application No. PCT/US2018/062235 International Search Report and Written Opinion dated Feb. 6, 2019.
PCT Application No. PCT/US2018/065804 International Search Report and Written Opinion dated Feb. 14, 2019.
U.S. Appl. No. 16/221,133 Office Action dated Dec. 12, 2019.
U.S. Appl. No. 16/192,629 Office Action dated Nov. 29, 2019.
U.S. Appl. No. 16/221,133 Final Office Action dated Jul. 2, 2020.

\* cited by examiner

400 ⤵

| Parameter | Value |
|---|---|
| Identity of offerer | |
| Location where services are offered | |
| Type of services offered | |
| Sell or buy offer | |
| Time period for services | |
| Amount of services | |
| Price per unit of services | |
| Payment terms | |
| ......... | |
| Other parameters as needed | |

| Parameter | Value | | | |
|---|---|---|---|---|
| Identity of seller | | | | |
| Seller digital signature | | | | |
| Identity of buyer | | | | |
| Buyer digital signature | | | | |
| Location where services are offered | | | | |
| Type of services offered | | | | |
| Time period for services | | | | |
| Amount of services | | | | |
| Price per unit of services | | | | |
| Payment terms | | | | |
| Reporting interval | | | | |
| Payment interval | | | | |
| Status:agreed,active or complete | | | | |
| ...... | | | | |
| Other parameters as needed | | | | |
| Report Section | Seller | Seller | Buyer | Buyer |
| Report interval 1 | | Price | | Price |
| Report interval 2 | | Price | | Price |
| ...... | | | | |
| Report interval 3 | | Price | | Price |

FIG. 5

DISTRIBUTED LEDGER SYSTEM FOR MANAGEMENT AND TRACKING OF EXCHANGES OF WIRELESS SERVICES BETWEEN WIRELESS SERVICE PROVIDERS

CROSS-REFERENCE TO RELATED APPLICATIONS

This application claims priority to U.S. Provisional Patent Application No. 62/589,597 filed on Nov. 22, 2017, the entire content of which is incorporated herein by reference.

BACKGROUND

Field of the Disclosure

The present disclosure relates to using distributed ledger architectures and cryptocurrencies to enable creation and execution of service agreements between wireless service providers for provisioning of wireless communication resources.

Description of the Related Art

Various generations of wireless technologies and supporting networks have been designed, standardized, implemented and used globally to service millions/billions of end users. These wireless networks have evolved from analog to digital radio access systems, from circuit switching to packet core, from proprietary mobility and administrative protocols to standardized protocols, and from single provider to multi provider networks.

The continuous evolution of these networks to cover as large of a geographical area as possible and serve as many users as possible, as well as the continuous evolution of collaboration and interaction between diverse access methods, have added complexities to administration of end users' mobility across different wireless networks. In other words, administration of roaming of end users from one wireless network to another has created complex technical and business administration problems.

Typically, these administration challenges are handled by various types of back office administrative functions for collecting information from their network and information received from each partner network on which a user device has roamed. With each network implementing such administrative functions, not only wireless network providers costs and overhead are increased, the management also requires use of network resources that can otherwise be dedicated to improve services provided to end users.

One can readily understand that this problem can only be exacerbated as more and more networks come online and provide services to end users. Manual administration and management of roaming services across hundreds or thousands (and possibly millions) of wireless networks would be time consuming and cost prohibitive.

Furthermore, agreed upon pricing of roaming services between providers of wireless networks can vary slowly between any two groups of wireless network providers and do not dynamically take into account that a cellular network is not homogenous in its value across location and time. The result of this slow-moving process is lost value opportunity for both the provider and consumer of roaming services across wireless networks. In other words, sellers are not rewarded for the unique value they may have in portions of their network and buyers may be overpaying in some cases.

Therefore, a platform that provides for an efficient, automatic and transparent creation and settlement of services between wireless service providers is needed.

SUMMARY

One or more example embodiments of inventive concepts are directed to using distributed ledger architectures and cryptocurrencies to enable creation and execution of service agreements between wireless service providers for provisioning of wireless communication resources.

One aspect of the present disclosure is a distributed ledger system for facilitating an exchange among wireless service providers, the distributed ledger system includes a plurality of wireless service providers, each wireless service provider being one of a home wireless network provider having a corresponding number of end users or a visited wireless network provider having wireless communication capacities for one or more of the end users to roam on. The distributed ledger system further includes a plurality of nodes, each of which is associated with one or more of the plurality of wireless service providers. Each of the plurality of nodes is configured to facilitate an exchange between at least a first wireless service provider and a second wireless service provider for roaming services; generate a recording of terms and conditions of the exchange between the first wireless service provider and the second wireless service provider to yield an agreement; record the agreement on the distributed ledger system; facilitate independent evaluation of performance parameters of the exchange by each of the first wireless service provider and the second wireless service provider to independently evaluate performance parameters of the exchange; and trigger milestone or total settlement for the exchange based on the independent evaluation of the performance parameters by the first wireless service provider and the second wireless service provider.

One aspect of the present disclosure includes one or more non-transitory computer-readable media have computer-readable instructions, which when executed by one or more processors, cause the one or more processors to provide a distributed ledger platform for automating service exchanges between two or more of a plurality of wireless service providers by facilitating an exchange between at least a first wireless service provider and a second wireless service provider for roaming services; generating a recording of terms and conditions of the exchange between the first wireless service provider and the second wireless service provider to yield an agreement; recording the agreement on the distributed ledger system; facilitating independent evaluation of performance parameters of the exchange by each of the first wireless service provider and the second wireless service provider to independently evaluate performance parameters of the exchange; and triggering milestone or total settlement for the exchange based on the independent evaluation of the performance parameters by the first wireless service provider and the second wireless service provider.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 4 is an example table of parameters and identifying information for an exchange;

FIG. 5 is an example table of terms and conditions of a finalized exchange between two wireless service providers;

DETAILED DESCRIPTION

Figure 1:
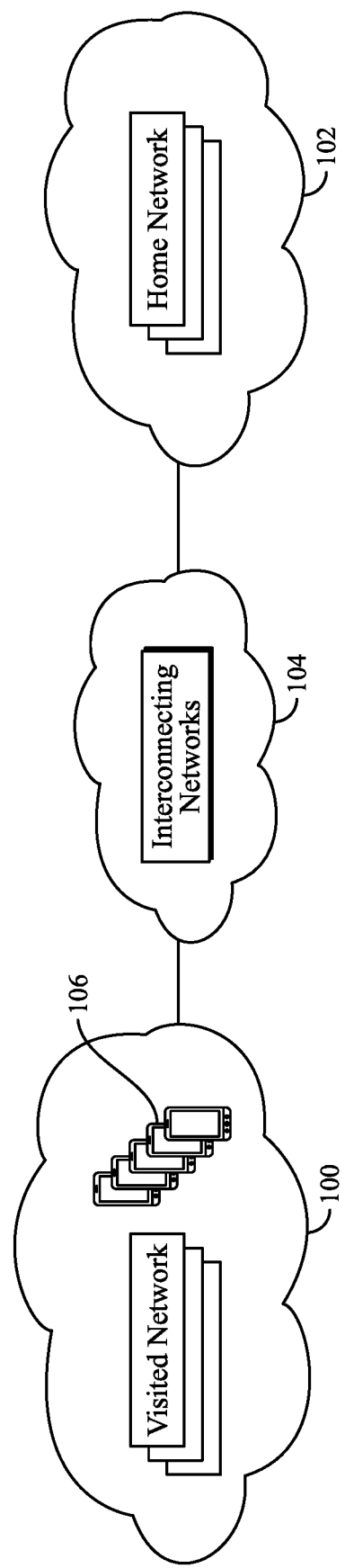
FIG. 1 illustrates an example ecosystem of home networks, visited networks and end users.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

Wireless network service providers (may also be referred to as wireless telecommunication service providers) participate in a wholesale marketplace, or ecosystem, for the purchase or sale (exchange) of wireless network capacity between them such that end users of one provider can roam, according to the agreed upon terms of such exchange. This process is sometimes referred to as roaming between networks where end users of a "home" network use the "visited" network's capacity and resources while traveling. The home network purchases this capacity at wholesale from the visited network. The home network then retails the service to their end users. Buyers may be sellers at the same time in different locations or for different uses. Sellers must operate, or be the managing entity, of wireless networks but buyers can have end users without necessarily having their own networks.

Administration and management of such agreements (wholesale agreements) between any two wireless network providers become more difficult as the number of available service providers increase. Furthermore, each network provider may need to allocate more network resources to such administration and management, which may come at the expense of having less network resources available for servicing end users. Hereinafter, example embodiments will be described according to which a distributed ledger system will be utilized to create, manage and record smart contracts that memorialize terms and conditions of an agreement or exchange between two service providers for roaming services followed by automatic execution and settlement of such exchanges without the need for dedicated network resources to such management and execution of exchanges as currently implemented by service providers.

Furthermore, as noted above, currently third party clearing houses handle, partially or entirely, management of exchanges of wireless services between wireless service providers. This management and communication with various parties to such exchanges require significant network infrastructure, servers, databases, etc. on behalf of the wireless service providers and the clearing houses. The concepts described in this application provide means and techniques to do away with such clearing houses and thus reduce network resource usage in managing exchanges by providing less centralized and more peer to peer schemes for exchange management.

FIG. 1 illustrates a diagram depicting multiple wireless networks where the users of one network may use the services of another network. As shown in FIG. 1, wireless networks and corresponding providers may be split into two groups, one of which may form a visited networks group 100 and another one of which may be a home networks group 102. Visited networks group 100 and home networks group 102 may communicate via any known or to be developed interconnecting networks 104 for exchange of user traffic. Each member of visited network group 100 can be a wireless network provider that provides wireless network capacity to end users (subscribers) of one or more wireless network providers of home networks group 102 and hence may be referred to as a visited network. Each member of home networks group 102 can be a wireless network provider that has one or more subscribers (e.g., end users 106) and hence may be referred to as a home network. End users 106 of a given home network can utilize services provided by one or more visited network and thus are shown in association with visited networks group 100 in FIG. 1 indicating that end users 106 are roaming (using wireless network capacities) on one or more visited networks of visited networks group 100.

In one example embodiment, coverage area of a visited network and a home network may overlap. Therefore, it may be desirable for the home network to enter into an exchange with the visited network to offload some of its traffic to visited network to both decrease its own network resource utilization and increase under-utilized resources of the visited network. In another example, a home network may not provide services in a geographical region in which the visited network provides coverage. Therefore, it may be desirable for the home network to enter into an exchange with the visited network to have end users of home network roam on the visited network.

Each one of end users 106 may be an electronic device or component capable of establishing and utilizing wireless network services of a provider. Examples of end users 106 include, but are not limited to, mobile phones, smartphones, tablets, laptops, cameras, any type of known or to be developed Internet of Things (IoT) devices, that utilize the capacity of a seller network provider.

Figure 2A:
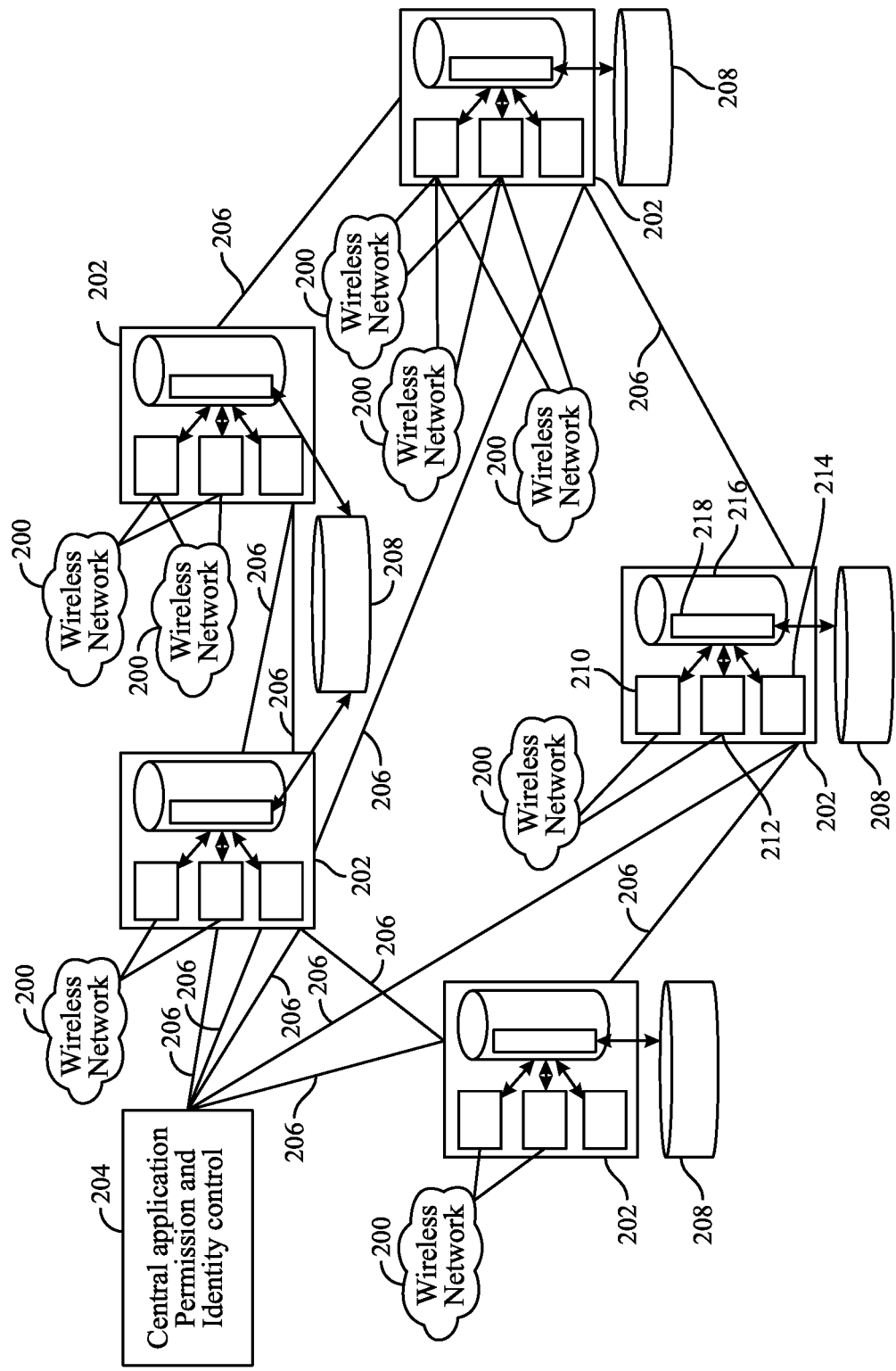
FIG. 2A is an illustrative block diagram of interconnection of components of ecosystem of FIG. 1 for exchange of services.

FIG. 2A is an illustrative block diagram of interconnection of components of ecosystem of FIG. 1 for exchange of services.

FIG. 2A illustrates a series of wireless networks 200, each of which may be one of a visited network or a home network described above with reference to FIG. 1. Each of wireless networks 200 may be a wireless service provider configured to provide wireless services to one or more user devices within a confined premise such as a building, a group of buildings in close proximity to each other, a group of buildings commonly owned but dispersed across multiple geographical locations, etc.

Figure 2B:
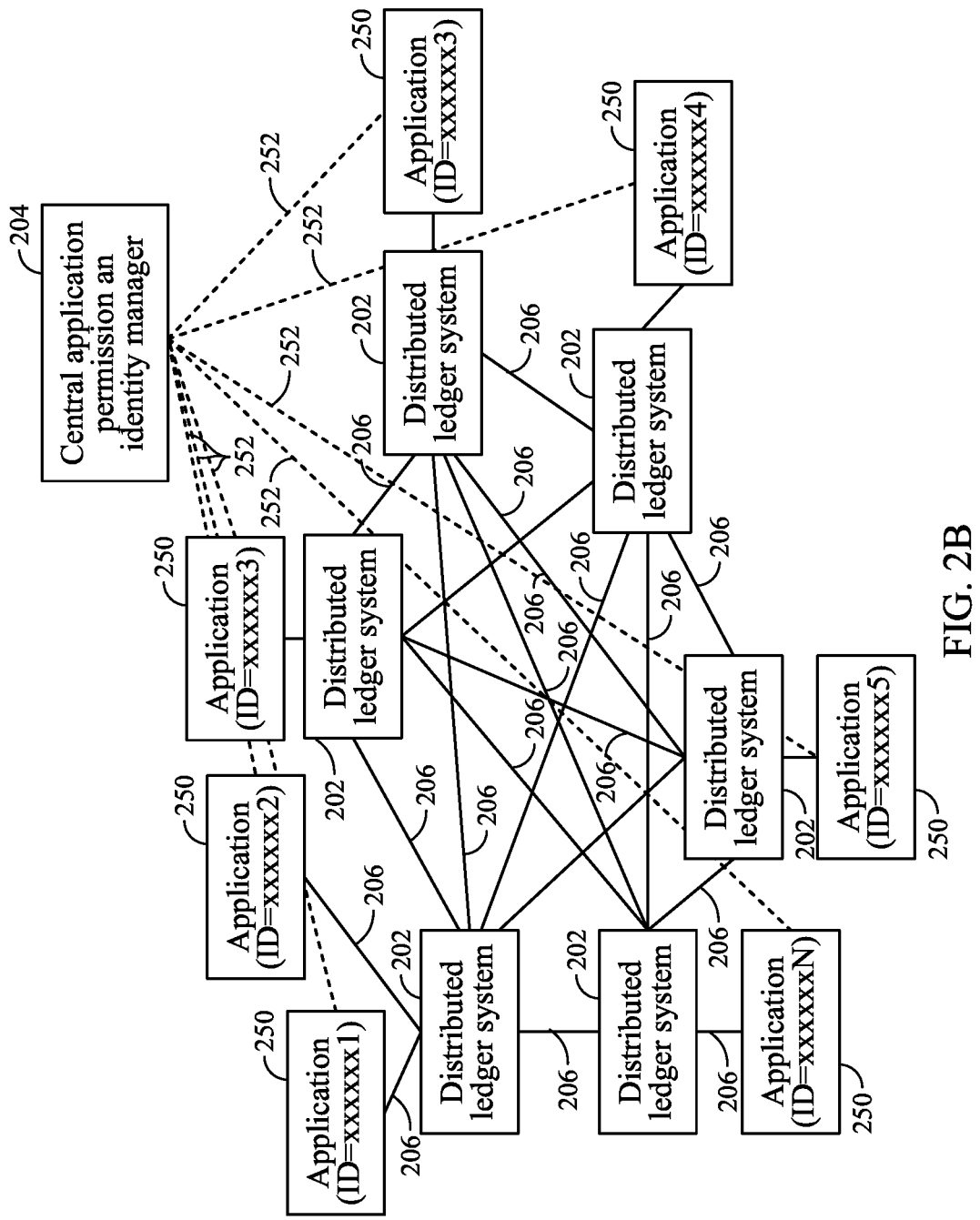
FIG. 2B is an illustrative block diagram of interconnection of components of ecosystem of FIG. 1 for exchange of services.

Each of wireless networks 200 of FIG. 2B may be associated with a node 202 on a permissioned blockchain (distributed ledger) system for automated management of exchange of services between wireless networks 200. Nodes 202 are connected to each other via one of links 204 which may be wireless links. Connected nodes 202 form the distributed ledger system and can be collectively referred to as the distributed ledger system 202.

Each node 202 may be a standalone server running computer-readable instructions to perform functionalities as will be described below with reference to FIG. 3. In another example, infrastructure on which a given node 202 is implemented may be provided by a private, public and/or a hybrid cloud service provider.

As shown in FIG. 2A, there may be more than one wireless network 200 associated with a given node 202.

FIG. 2A further illustrates a central application permission and identity control component 204, which may hereinafter be referred to as controller 204. Controller 204 may also be considered a component of the distributed ledger system. In one example, controller 204 may manage participation of wireless service providers within distributed ledger system, validate their identities, provide them with encryption keys for storing information on one or more nodes of distributed ledger system, manage visibility of each wireless provider 200's information to other wireless service providers 200, etc.

Each node 202 of distributed ledger system may implement computer-readable instructions to enable an exchange of wireless services or network resources between at least two wireless service providers 200 (e.g., one home wireless network and one visited wireless network) according the process of FIG. 3, which will be described below.

Links 206, which may be any known or to be developed wired and/or wireless communication means for communicatively coupling any one of components of FIG. 2A to any other component of FIG. 2A.

Each node 202 of FIG. 2A may have a distributed storage node 208 associated therewith, which together form a database for storing various information regarding exchanges between wireless networks. By utilizing a network of distributed storage nodes 208, each node 202 does not need to keep record of exchanges and may simply store a pointer to a location in distributed storage nodes 208 at which corresponding data is stored.

As shown in FIG. 2A, there may be more than one node 202 associated with a given distributed storage node 208.

Nodes 202 each may have components including an access control node 210 (a client node) providing access control to corresponding wireless network(s) 200, a reporting node 212 for reporting various types of information regarding exchanges to corresponding wireless network(s) 200, a validation node 214 for validating chain code 216, exchanges, payments for exchanges, etc. before such information is recorded on the distributed ledger system, a fabric ledger 218 having chain code 216 for recording information about exchanges onto the distributed ledger system (e.g., blockchain). Components 210, 212, 214, 216 and 218 have been referenced in FIG. 2A for one of nodes 202 but it is readily ascertainable that each such component exists on each of nodes 202.

FIG. 2B is an illustrative block diagram of interconnection of components of ecosystem of FIG. 1 for exchange of services.

Similar to FIG. 2A, example ecosystem of FIG. 2B includes nodes 202, controller 204 and links 206. FIG. 2B illustrates a number of application nodes 250, where each node 202 may have more than one application node 250 associated therewith. In other words, applications nodes 250 are decoupled from nodes 202 in FIG. 2B, which allows for scalability of distributed ledger system formed of nodes 202 due to allowing for multiple wireless service providers such as wireless service providers 200 being able to utilize any one of application nodes 250 to form, execute and settle an exchange for wireless network services with any other wireless service provider 200 within the ecosystem shown in FIG. 2B. As shown in FIG. 2B, each application node 250 may have a corresponding identification (ID) (e.g., in the format of xxxxxx1 to xxxxxxN as shown in FIG. 2B, where N is a positive integer greater than 1).

Each application node 250 may be executed on a standalone server associated with a corresponding wireless service provider 200 or may be executed on a cloud based infrastructure accessible to wireless service providers 200.

FIG. 2B further illustrates links 252 between controller 204 and each of application nodes 250, which, as will be described below, enables management of participants (wireless service providers 200) within the ecosystem, providing them with encryption keys for registering and recording content on the distributed ledger system, etc., as will be described below.

Figure 3:
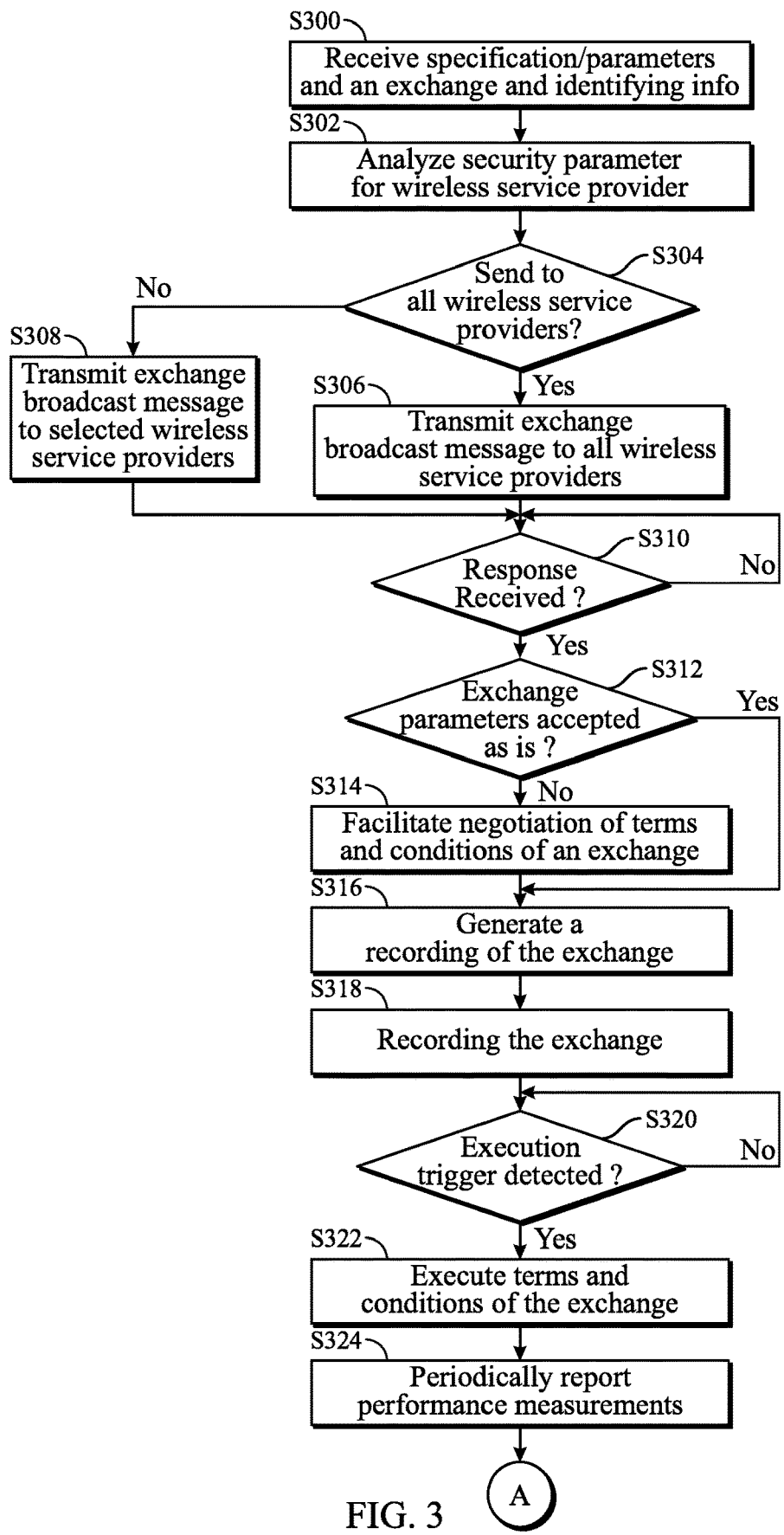
FIG. 3 is an example method of creating, managing and settlement of wireless service exchanges between two or more wireless network providers.
Figure 3:
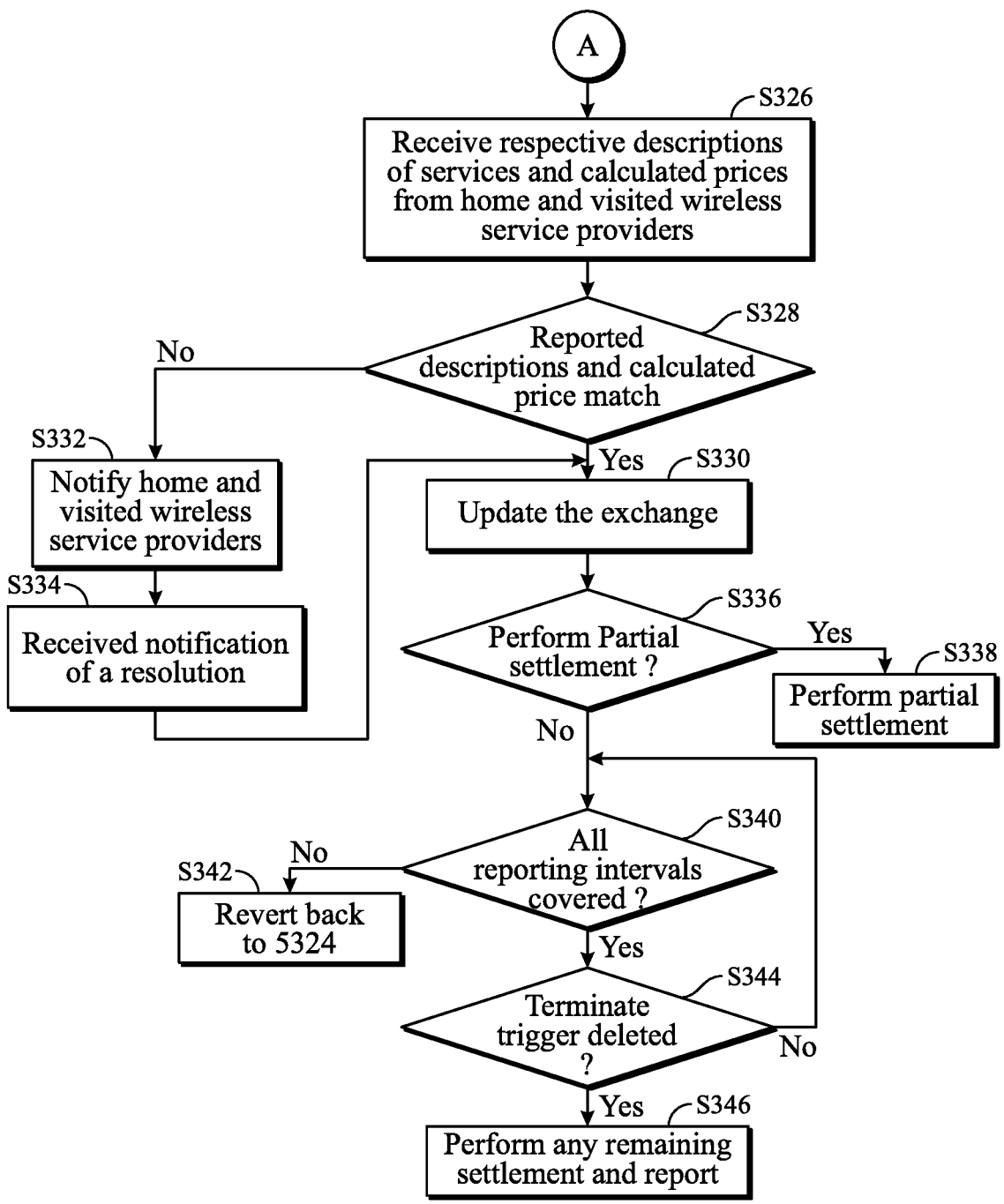

FIG. 3 is an example method of creating, managing and settlement of wireless service exchanges between two or more wireless network providers. FIG. 3 will be described from perspective of any one of application nodes 250 of FIG. 2B. However, it will be understood that each application node 250 may have one or more processors having computer-readable instructions stored thereon, which when executed by one or more processors, allow node 202 to perform steps of FIG. 3 as will be described below. Furthermore, FIG. 3 will be described with reference to FIGS. 1 and 2A-B. Within example structure of FIG. 2A, steps of FIG. 3 may be performed by each node 202 which may have one or more processors having computer-readable instructions stored thereon, which when executed by one or more processors, allow each node 202 to perform steps of FIG. 3 as will be described below.

In yet another example, one or more steps of the process described below with reference to FIG. 3 may be performed by controller 204 of FIG. 2A or FIG. 2B. In such case, steps S300 to S310 of FIG. 3 may be implemented by controller 204 while remaining steps of FIG. 3 (i.e., S312 to S346) may be performed by application nodes 250 or nodes 202.

At S300, application node 250 (which can be any one of application nodes 250 of FIG. 2B) may receive exchange specification (parameters) and identification information from a wireless service provider 200 using application node 250. Such exchange specification may include parameters of wireless network services sought by the wireless service provider 200 (when such wireless service provider is a home service provider seeking to enter into an exchange with a visited wireless service provider for its users to roam on) or may include parameters of wireless network services offered to users of home network service provider(s) (when such wireless service provider is a visited service provider seeking to advertise availability of its wireless network resources for visiting user devices to roam on).

FIG. 4 is an example table of parameters and identifying information for an exchange received at S300. As shown in FIG. 4, table 400 includes parameter column 402 and value column 404. Each entry in parameter column 402 defines an exchange specification parameter with a corresponding definition, notes and/or value thereof being specified in a corresponding entry in value column 404. Example exchange parameters, as shown in table 400, include, but are not limited to, identity of offerer (identification information of wireless service provider 200 from which the exchange specification and identifying information are received at S300), location at which wireless network services, type of wireless services offered, whether the exchange is a sell (in case of wireless services being sought by a home wireless network provider) or a buy (in case of wireless services being offered for roaming by a visited wireless network provider), time period during which the wireless services are offered, amount of services (e.g., data usage allowance, etc.), price per unit of services (e.g., price per gigabyte of data), payment terms (e.g., milestone, monthly, lump sum, etc.) and other any other known or to be developed parameters that are of importance to a home wireless service provider and a visited wireless service provider entering into an exchange.

While table 400 illustrates exchange parameters of an offer exchange (one being offered by a visited wireless service provider), table 400 can similarly include adjusted entries and corresponding values to indicate exchange parameters of an exchange solicitation (one being solicited by a home wireless service provider). For example, in case of an exchange solicitation, identify of offerer may be changed to indicate identity of solicitor, type of services offered may be changed to indicate type of services sought or solicited, location where wireless services are sought instead of offered, etc. The parameters and identifying information may be made available to other wireless service providers via the distributed public ledger of FIGS. 2A and 2B in a form of a broadcast message or an exchange broadcast message.

Referring back to FIG. 3, at S302, application node 250 may analyze the security specification for the wireless service provider 200 from which the parameters and identifying information are received at S300 for purposes of broadcasting an exchange broadcast message to other wireless service providers 200. Each wireless service provider 200 using distributed ledger system via nodes 202 may be provided a cryptographic identification by controller 204, which may be used by wireless service provider to encrypt information communicated to and from other wireless service providers via the distributed public ledger or for recording and validating them on the distributed ledge system. Each wireless service provider 200 may opt to use the encryption ID to make the exchange broadcast message available only to certain ones of wireless service providers 200 using the distributed ledger system or to all wireless service providers 200.

At S304, application node 250 may determine if the analysis of S302 indicates that the exchange broadcast message is to be sent to all wireless service providers 200. If at S304, application node 250 determines that the exchange broadcast message is to be sent to all wireless service providers 200, the process proceeds to S306, where application node may post the exchange broadcast message on a corresponding node 202 to be shared and made available to all wireless service providers 200 having access to other nodes 202 of the distributed ledger system. However, if at S304, application node 250 determines that the analysis of S302 indicates that the exchange broadcast message is to be encrypted and shared with only a subset of the wireless service providers 200, then at S308, application node 202 broadcasts (sends) the exchange broadcast message to the subset of the wireless service providers 200, which may include one or more of wireless service providers 200 that have access to distributed ledger system.

At S310, application node 250 determines if a response to the exchange broadcast message is received from at least one other wireless service provider 200. If not, the process of S310 is repeated (continuously or periodically) until a response is received. In one example, exchange broadcast message may have a lifetime associated therewith such that if a response thereto is not received within the lifetime, the exchange parameters and specifications are discarded and deleted from the distributed ledger system.

If at S310, application node 250 determines that a response to the exchange broadcast message is received, then at S312, application node 250 determines if the exchange specifications and parameters as included in the exchange broadcast message are accepted (accepted as is and without alteration). If accepted as is, the process proceeds to S316, which will be further described below. However, if at S312, application node 250 determines that the response includes modified specifications (parameters) for the exchange, then at S314, application node 250 facilitates negotiation of the parameters to determine terms and conditions for the exchange.

At S314, application node 250 may facilitate (enable) negotiation of terms and conditions of an exchange between home and service network providers 200 from which the service broadcast message and the response are received. In each of the service broadcast message and the response, there may be an acceptable range associated with each parameter. For example, there may be a range of quality of service acceptable to a home network for its end users provided in a coverage area of the visited network. Furthermore, there may be price range for data usage that is acceptable to a home network. Similarly, there may be a price range for data usage offered by a visited wireless network. Accordingly, at S314, application node 250 facilitates negotiation of home and visited wireless networks to come to an agreement on various terms based on various set ranges by each side for different parameters.

In one example, the negotiation of terms and conditions may be carried out automatically and without further input from an operator of either the home network or the visited wireless network. For example, over time data may be collected by each application node 250 about various types of services offered by each home network node to its subscribers and end users, historical data on exchanges entered into by home and visited wireless networks, market conditions and historical fluctuations related to pricing of wireless network resources, etc. Such data may be stored in a single or a distributed network of databases accessible by any given one of nodes 250. Furthermore, such data may be fed into a machine learning algorithm that can, over time, learn and predict behavior, preferences and reasonable terms and conditions for exchanges between any given home wireless network and any given visited wireless network. Therefore, output of such machine learning algorithm may be used to facilitate and finalize terms and conditions of an exchange between a home wireless network and a visited wireless network at S314.

Thereafter, at S316, application node 250 generates a recording of the terms and conditions for a finalized exchange of wireless network services between a home network and a visited home network. In one example, the steps of S300 to S316 may collectively be referred to as generation of a smart contract (which is an example of a chain code) for exchange of wireless network services between a home network and a visited home network, an example of which is illustrated in a tabular format in FIG. 5.

FIG. 5 is an example table of terms and conditions of a finalized exchange between two wireless service providers. As shown in FIG. 5, table 500 includes a parameters column 502 that has a plurality of entries each of which identifies a different term or condition of the finalized exchange (smart contract) including, but not limited to, identities of home and visited wireless service providers (buyer and seller) that are parties to the smart contract, their corresponding signatures, parameters described above with reference to table 400 of FIG. 4, payment terms including method of payment (e.g., cryptocurrency, conventional payment methods, etc.), reporting intervals, payment intervals, status of the exchange and/or any other known or to be developed and agreed upon terms or conditions.

Table 500 also includes a value column 504, each entry of which includes a definition, notes and/or value of a corresponding parameter from the parameters column 502. Table 500 also includes a report section 506 with multiple entries, each of which corresponds to a reporting interval during which performance measurements (performance metrics or measurement metrics) of the exchange are reported to parties to the exchange (e.g., the home and visited wireless service providers 200) for validation and confirmation, as will be described below. Once validated, the corresponding performance measurement and/or price thereof are recorded in corresponding entries in measurement value section 508. As shown in FIG. 5, section 508 includes a seller column 510 such that for each reporting interval, the seller (e.g., a visited wireless service provider that is a party to the exchange) can provide a description of services provided. For each description, seller price column 512 provides a corresponding price as calculated by the seller. Section 508 also includes a buyer column 514 such that for each reporting interval, the buyer (e.g., a home wireless service provider that is a party to the exchange) can provide a description of services utilized. For each description, buyer price column 516 provides a corresponding price as calculated by the buyer. Entries in section 508 may be populated at S326, as will be described below.

Tables such as table 500 and/or any other data pertaining to an exchange between two or more wireless service providers may be stored in a centralized database that is accessible by any one of application nodes 250 and/or nodes 202. Accordingly, instead of requiring storage capacity for storing of large amount of data, each such node (i.e., an application node 250 or a node 202) may have a corresponding pointer pointing to a location in the centralized database in which the relevant portion of the data is stored, for retrieving the relevant portion of the data when needed.

Referring back to FIG. 3, at S318, application node 250 records the agreement (the smart contract) on the distributed ledger system (e.g., a blockchain described above with reference to FIGS. 2A-B) according to any known or to be developed method.

At S320, application node 250 determines if a triggering condition (execution trigger) for execution of terms and conditions of the agreement have been detected. In one example, a triggering condition can be detection of presence of any one or more end users of a home network that is a party to the agreement in coverage area of a visited network that is the other party to the agreement. Another example of a triggering condition can be an agreed upon date (including validation or enforcement period) and time frame for the exchange between the home and visited networks.

If at S320, application node 250 determines that no triggering condition is detected, then S320 is repeated (continuously or periodically (e.g., every few seconds, minutes, hours, etc.)) until a triggering condition is detected.

Once a triggering condition is detected at S320, at S322, application node 250 executes appropriate ones of terms and conditions of the agreement as applicable. For example, data usage by end users of home network roaming on the visited network may be monitored.

At S324, application node 250 periodically or continuously (e.g., as specified by reporting interval of table 500, which can be for example, once a minute, once every hour, once every 24 hours, once a week, etc.), transmits performance measurements to parties to the exchange. For example, visited wireless service provider 200 (seller) provides, via corresponding application node 250, measurements of services used by end users of home wireless service provider 200 (buyer) roaming on the visited wireless network provider 200's network.

At S326, each of visited and home wireless service providers 200 that are parties to the exchange may provide their corresponding description of services and calculated prices therefor to be included in table 500 under corresponding entry of each reporting interval.

At S328, application node 250 determines if the descriptions and corresponding calculated prices reported by the visited and home wireless service providers 200 match (are consistent). If a match exists, then at S330, application node 250 updates the exchange by populating corresponding entries in section 508 of table 500. If a match does not exist, then at S332, application node 250 notifies each one of home and visited wireless service providers 200 that are parties to the exchange, of the inconsistency and mismatch between the reported descriptions and/or prices of services utilized/provided. This notification may trigger respective operators of home and visited wireless service providers to resolve the inconsistencies. Thereafter, at S334, application node 250 receives a notification of a dispute resolution indicating that the inconsistencies between the reported descriptions and/or corresponding calculated prices.

In one example, determination of an exact match between the reported descriptions and calculated prices at each reporting interval may be replaced with an approximate match such that as long as reported descriptions and corresponding prices are within a margin of error (e.g. within 1%, 2%, 5%, etc.) of one another, application node 250 may consider the approximate match as an exact match. Such tolerance and margin of error value may be specified by terms and conditions of the exchange, based on machine learning analysis of historical values and prior calculations, network operator provided values, etc.

Thereafter, the process reverts back to S330. At S336, application node 250 determines if a partial (milestone) settlement is to be performed for services rendered up to the current reporting interval or not. This determination may be based on terms and conditions specified under the payment method in table 500. In another example, partial settlement may be based on expiration of an agreed upon time period. For example, home and visited wireless networks 200 may have agreed to a monthly settlement for the exchange even if the exchange's duration is longer than a month. Other examples may include hourly, daily, weekly, annual settlements, etc.

If at S336 application node 250 determines that a partial settlement is to be performed, then at S338, application node 250 performs partial settlement. In one example, application node 250 automatically settles (processes payment) for the exchange based on terms and conditions of the agreement using any type of agreed upon payment method including cryptocurrencies (e.g., bitcoin, ethereum, and/or any other known or to be developed proprietary or publicly available cryptocurrencies, etc.), credit cards, etc., as indicated by entries of the smart contract as shown in table 500 of FIG. 5.

If at S336 application node 250 determines that a partial settlement is not to be performed, then at S340, application node 250 determines if all reporting intervals, as specified by terms and conditions of the exchange are covered. If not, at S342, the process reverts back to S324 to repeat S324 to S342 for each remaining reporting interval.

However, once all reporting intervals are covered, then at S344, application node 202 determines if another triggering condition (termination trigger) has been detected for terminating execution of terms and conditions of the agreement. Such triggering condition can be a determination that one or more end users of home network have stopped roaming (are no longer detected) on the visited network. Another triggering condition can be a termination date specified as part of the terms and conditions within the agreement.

If at S344, a termination trigger is not detected, application node 202 reverts back to S340 and S40 to S344 are repeated until a termination trigger is detected. Once a termination trigger is detected, at S346, application node 202 automatically settles (process payment) for the exchange or any remaining portion thereof (not settled through partial settlement at S338) based on terms and conditions of the agreement using any type of agreed upon payment method including cryptocurrencies (e.g., bitcoin, ethereum, etc.), credit cards, etc.

Another example method of creating, managing and settling exchange of wireless services between two or more home and visited wireless service providers will be described below with reference to FIG. 6.

Figure 6:
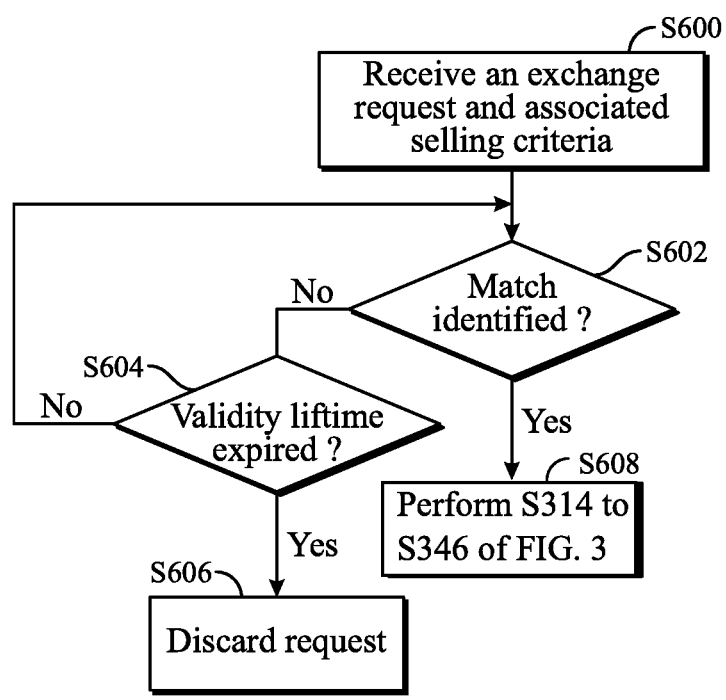
FIG. 6 is an example method of creating, managing and settlement of wireless service exchanges between two or more wireless network providers.

FIG. 6 is an example method of creating, managing and settlement of wireless service exchanges between two or more wireless network providers. FIG. 6 will be described from perspective of any one of application nodes 250 of FIG. 2B. However, it will be understood that each application node 250 may have one or more processors having computer-readable instructions stored thereon, which when executed by one or more processors, allow node 202 to perform steps of FIG. 3 as will be described below. Furthermore, FIG. 6 will be described with reference to FIGS. 1 and 2A-B. Furthermore, within example structure of FIG. 2A, steps of FIG. 6 may be performed by each node 202 which may have one or more processors having computer-readable instructions stored thereon, which when executed by one or more processors, allow each node 202 to perform steps of FIG. 6 as will be described below.

In yet another example, one or more steps of the process described below with reference to FIG. 6 may be performed by controller 204 of FIG. 2A or FIG. 2B. In such case, steps S600 to S608 of FIG. 6 may be implemented by controller 204 while S608 of FIG. 6 may be performed by application nodes 250 or nodes 202.

At S600, an application node 250 associated with a wireless service provider 200 may receive a request for available exchange offers by other wireless service providers 200. For example, the request may be for available exchange offers by one or more visited wireless service providers 200. In another example, the request may be for available exchange solicitations by one or more home wireless service providers. The request may have one or more filtering criteria associated therewith. For example, the request may specify a specification of types of network services solicited or offered, an acceptable range of quality of service provided, an acceptable range of pricing for the wireless services, a desired time period of availability of the wireless services, etc.

At S602, application node 250 determines if a match for the request is available (a match is identified) on the distributed ledger system based on the filtering criteria associated with the request. If a match does not exist, at S604, application node 250 determines if the request has expired. The request may have a validity lifetime associated therewith (which may be a configurable parameter determined based on experiments and/or empirical studies). If the request is not expired, the process reverts back to S602 and S602 is repeated until a match is identified or the request expires.

If at S604, application node 250 determines that the request has expired, then at S606, application node 250 discards the request. However, once a match is detected at S602, then at S608, application node 250 performs steps S314 to S346 of FIG. 3, as described above.

Implementing example process of FIG. 3 and/or FIG. 6 for creating, managing and execution a smart contract for an exchange of wireless network services may provide the following advantages. Using the distributed ledger system to record an entire life cycle of a smart contract or agreement (including creation, terms and conditions, execution and method of payment) can create a reputable record for each wireless network provider including but not limited to, quality of services provided by a visited network, whether a particular home network or visited network honored terms and conditions of an exchange, timely payment for services by a given home network for roaming services provided by a visited network to home network's end users, etc.

In one example, a "reputation" score may be assigned to each wireless network. Because any given wireless network can act as a home network in one instance and as a visited network in another, a home reputation score and a visited reputation score may be assigned to each wireless network 200. For example, a home reputation score may be indicative of how timely a home network has paid for roaming services provided by a visited network to its end users. In another example, a visited reputation score may be indicative of the quality of roaming services provided by a corresponding wireless network to end users of a home network.

In one example, the platform provided by the collection of nodes 202 may take such scores into consideration in determining pricing and/or other terms and conditions of services in the agreement. For example, a roaming service provided to a home network with a perfect home reputation score may be priced lower (be eligible for discounts) relative to the same roaming service with a relatively lower home reputation score due to delinquent payment history, late payments in the past, etc.

Furthermore, such scores may be taken into consideration by any given home network or visited network, when deciding to enter into negotiations for an exchange. In other words, different exchanges between different wireless networks 200 may be different (dynamically adjusted) by further, in addition to factors and negotiated terms described above, taking into consideration each wireless network's reputation score (home reputation score or visited reputation score, as applicable).

Having described various examples of creation, management and execution of agreements for exchange of wireless communication services, various components of a node 202, an application node 250, or controller 204 will be described with reference to FIG. 7.

Figure 7:
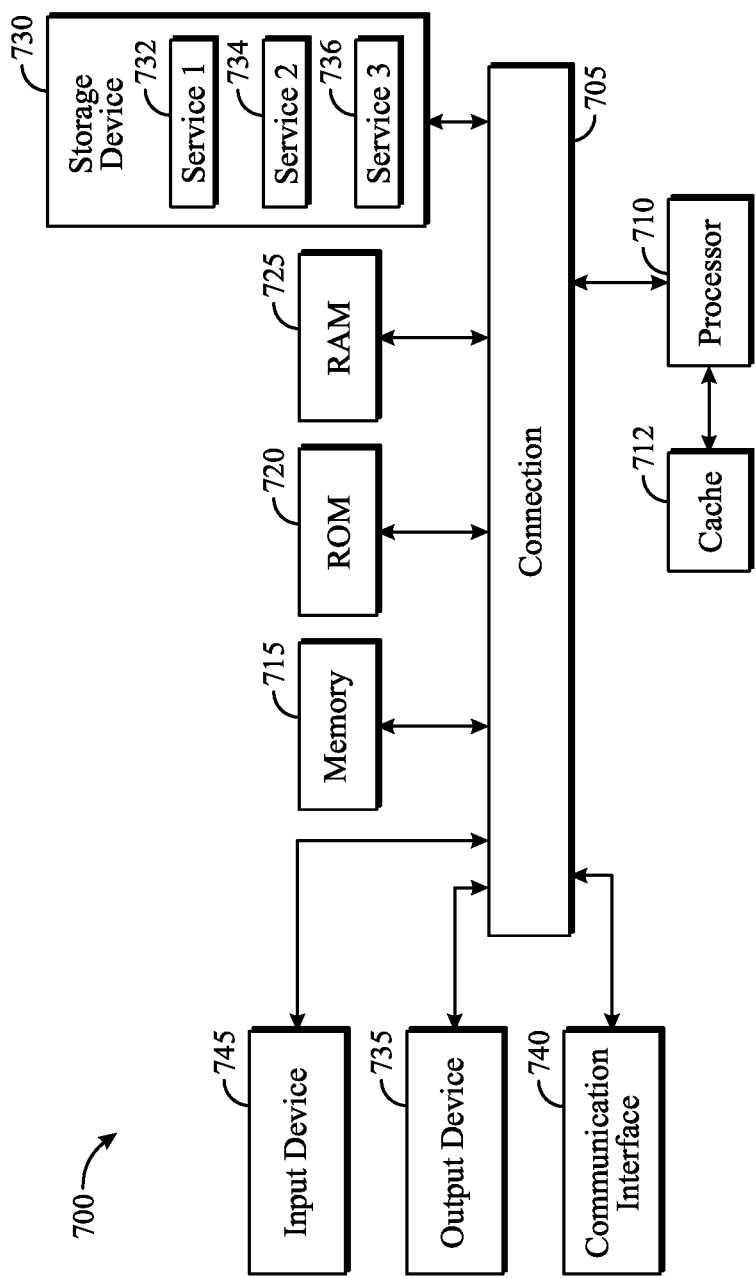
FIG. 7 illustrates example components of a node of FIGS. 2A-B.

FIG. 7 illustrates example components of a node of FIGS. 2A-B.

In this example, FIG. 7 illustrates a computing system 700 including components in electrical communication with each other using a connection 705, such as a bus. System 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric. The storage device 730 can be local and directly attached to connection 705 or can be located far away and communicatively coupled to other components of system 700.

To enable user interaction with system 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with system 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

Example embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A distributed ledger system for facilitating an exchange among wireless service providers, the distributed ledger system comprising:
    a plurality of wireless service providers, each wireless service provider being one of a home wireless network provider having a corresponding number of end users or a visited wireless network provider having wireless communication capacities for one or more of the end users to roam on; and
    a plurality of nodes, each of which is associated with one or more of the plurality of wireless service providers, each of the plurality of nodes being configured to:
        facilitate an exchange between at least a first wireless service provider and a second wireless service provider for roaming services;
        generate a recording of terms and conditions of the exchange between the first wireless service provider and the second wireless service provider to yield an agreement, the terms and conditions of the exchange including quality of service of coverage provided by the first wireless service provider, time frame associated with availability of the coverage provided by the first wireless service provider, measurement metrics for the coverage provided by the first wireless service provider, pricing information associated with the measurement metrics, and accepted payment methods by the first wireless service provider;
        record the agreement on the distributed ledger system;
        facilitate independent evaluation of performance parameters of the exchange by each of the first wireless service provider and the second wireless service provider; and
        trigger milestone or total settlement for the exchange based on the independent evaluation of the performance parameters by the first wireless service provider and the second wireless service provider.

2. The distributed ledger system of claim 1, wherein a first one of the plurality of nodes is further configured to:
    receive exchange parameters and identification information associated with the exchange from the first wireless service provider;
    transmit an exchange broadcast message including the exchange parameters to remaining ones of the plurality of wireless service providers; and
    facilitate the exchange between the first wireless service provider and the second wireless service provider.

3. The distributed ledger system of claim 2, wherein the parameters and identifying information are encrypted and sent to one or more of the plurality of wireless service providers having an encryption key with the first wireless service provider.

4. The distributed ledger system of claim 1, wherein a first one of the plurality of nodes is further configured to:
    receive from the first wireless service provider, filtering criteria specifying desired terms and conditions for the exchange;
    search exchange proposals from one or more other wireless service providers available on the distributed ledger system; and
    identify one of the exchange proposals as the exchange, terms and conditions of which matches the filtering criteria or is within a defined tolerance of the filtering criteria.

5. The distributed ledger system of claim 1, wherein each of the plurality of nodes is further configured to:
    periodically report performance measurements associated with the exchange to the first wireless service provider and the second wireless service provider; and
    receive independent description and calculated prices for utilized services from each of the first wireless service provider and the second wireless service provider.

6. The distributed ledger system of claim 5, wherein each of the plurality of nodes is further configured to:
    determine that the independent description and calculated prices received from the first wireless service provider and the second wireless service provider, match; and
    trigger milestone settlement for the exchange based at least in part on determining that the independent description and calculated prices received from the first wireless service provider and the second wireless service provider match.

7. The distributed ledger system of claim 1, wherein the terms and conditions are in part based on respective reputation score of each of the first wireless service provider and the second wireless service provider.

8. The distributed ledger system of claim 1, wherein each of the plurality of nodes is further configured to:
automatically finalize the terms and conditions of the exchange using machine learning based analysis of past exchanges entered into by the first wireless service provider and the second wireless service provider, corresponding exchanges of each of the first wireless service provider and the second wireless service provider with third party providers, and market conditions associated with exchanges between any two wireless service provider.

9. The distributed ledger system of claim 1, wherein each of the plurality of nodes is configured to:
detect a triggering condition for executing the exchange; and
execute the terms and conditions of the exchange upon detecting the triggering condition.

10. One or more non-transitory computer-readable media having computer-readable instructions, which when executed by one or more processors, cause the one or more processors to provide a distributed ledger platform for automating service exchanges between two or more of a plurality of wireless service providers by:
facilitating an exchange between at least a first wireless service provider and a second wireless service provider for roaming services;
generating a recording of terms and conditions of the exchange between the first wireless service provider and the second wireless service provider to yield an agreement, the terms and conditions of the exchange including quality of service of coverage provided by the first wireless service provider, time frame associated with availability of the coverage provided by the first wireless service provider, measurement metrics for the coverage provided by the first wireless service provider, pricing information associated with the measurement metrics, and accepted payment methods by the first wireless service provider;
recording the agreement on the distributed ledger system;
facilitating independent evaluation of performance parameters of the exchange by each of the first wireless service provider and the second wireless service provider to independently evaluate performance parameters of the exchange; and
triggering milestone or total settlement for the exchange based on the independent evaluation of the performance parameters by the first wireless service provider and the second wireless service provider.

11. The one or more non-transitory computer-readable media of claim 10, wherein execution of the computer-readable instruction cause a first node of the distributed ledger system to:
receive exchange parameters and identification information associated with the exchange from the first wireless service provider;
transmit an exchange broadcast message including the exchange parameters to remaining ones of the plurality of wireless service providers; and
facilitate the exchange between the first wireless service provider and the second wireless service provider.

12. The one or more non-transitory computer-readable media of claim 11, wherein the parameters and identifying information are encrypted and sent to one or more of the plurality of wireless service providers having an encryption key with the first wireless service provider.

13. The one or more non-transitory computer-readable media of claim 10, wherein execution of the computer-readable instruction cause a first node of the distributed ledger system to:
receive from the first wireless service provider, filtering criteria specifying desired terms and conditions for the exchange;
search exchange proposals from one or more other wireless service providers available on the distributed ledger system; and
identify one of the exchange proposals as the exchange, terms and conditions of which matches the filtering criteria or is within a defined tolerance of the filtering criteria.

14. The one or more non-transitory computer-readable media of claim 10, wherein execution of the computer-readable instruction cause each of a plurality of nodes of the distributed ledger system to:
periodically report performance measurements associated with the exchange to the first wireless service provider and the second wireless service provider; and
receive independent description and calculated prices for utilized services from each of the first wireless service provider and the second wireless service provider.

15. The one or more non-transitory computer-readable media of claim 14, wherein execution of the computer-readable instruction cause each of the plurality of nodes of the distributed ledger system to:
determine that the independent description and calculated prices received from the first wireless service provider and the second wireless service provider, match; and
trigger milestone settlement for the exchange based at least in part on determining that the independent description and calculated prices received from the first wireless service provider and the second wireless service provider match.

16. The one or more non-transitory computer-readable media of claim 10, wherein the terms and conditions are in part based on respective reputation score of each of the first wireless service provider and the second wireless service provider.

17. The one or more non-transitory computer-readable media of claim 10, wherein execution of the computer-readable instruction cause each of a plurality of nodes of the distributed ledger system to:
automatically finalize the terms and conditions of the exchange using machine learning based analysis of past exchanges entered into by the first wireless service provider and the second wireless service provider, corresponding exchanges of each of the first wireless service provider and the second wireless service provider with third party providers, and market conditions associated with exchanges between any two wireless service provider.

18. The one or more non-transitory computer-readable media of claim 10, wherein execution of the computer-readable instruction cause each of a plurality of nodes of the distributed ledger system to:
detect a triggering condition for executing the exchange; and execute the terms and conditions of the exchange upon detecting the triggering condition.

\* \* \* \* \*